United States Patent [19]

Pennington

[11] 3,780,756
[45] Dec. 25, 1973

[54] SWITCH
[75] Inventor: John V. Pennington, Houston, Tex.
[73] Assignee: Cameron Iron Works, Inc., Houston, Tex.
[22] Filed: Nov. 22, 1972
[21] Appl. No.: 308,796

Related U.S. Application Data
[63] Continuation of Ser. No. 121,883, March 8, 1971, abandoned.

[52] U.S. Cl................ 137/119, 137/610, 243/31
[51] Int. Cl. .......................................... G05d 11/00
[58] Field of Search............... 302/14, 2 R; 243/29, 243/30, 31, 39; 193/31 R; 166/.5; 137/119, 610

[56] References Cited
UNITED STATES PATENTS
1,713,672  5/1929  Meyers ........................... 243/31 X
1,733,026  10/1929  McGuinness et al. ............ 243/31 X
1,753,989  4/1930  Hohne ................................. 243/30
1,951,434  3/1934  Needham.......................... 243/31 X
3,512,554  6/1970  Childers........................... 137/119 X FOREIGN PATENTS OR APPLICATIONS
739,111  7/1966  Canada................................ 243/30

Primary Examiner—Evon C. Blunk
Assistant Examiner—H. S. Lane
Attorney—Marvin B. Eickenroht

[57] ABSTRACT

A switch for fluidly connecting a pipeline with a selected branch line in response to the passage of a tool therethrough.

39 Claims, 19 Drawing Figures

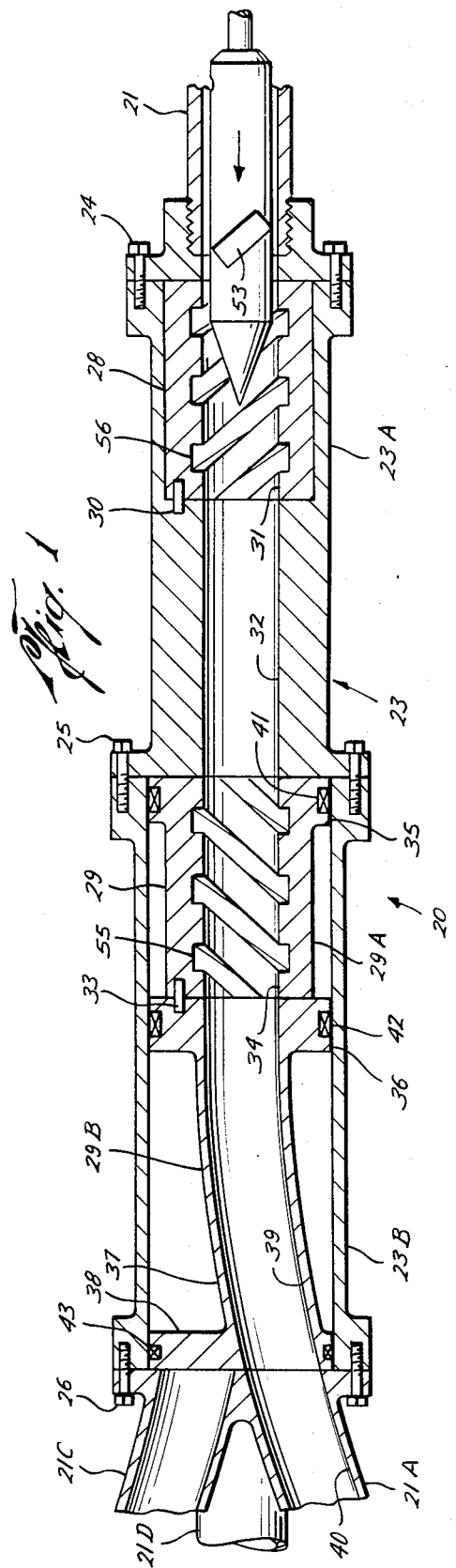
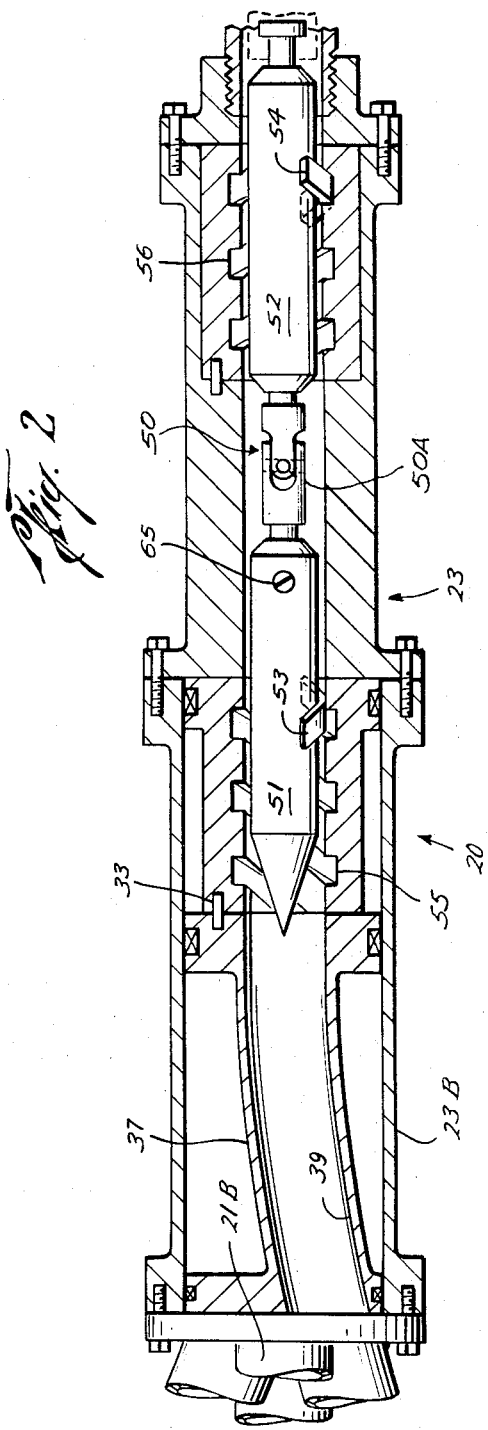
John V. Pennington
INVENTOR.
BY Lyer, Eckenrolt,
Thompson & Turner
ATTORNEYS

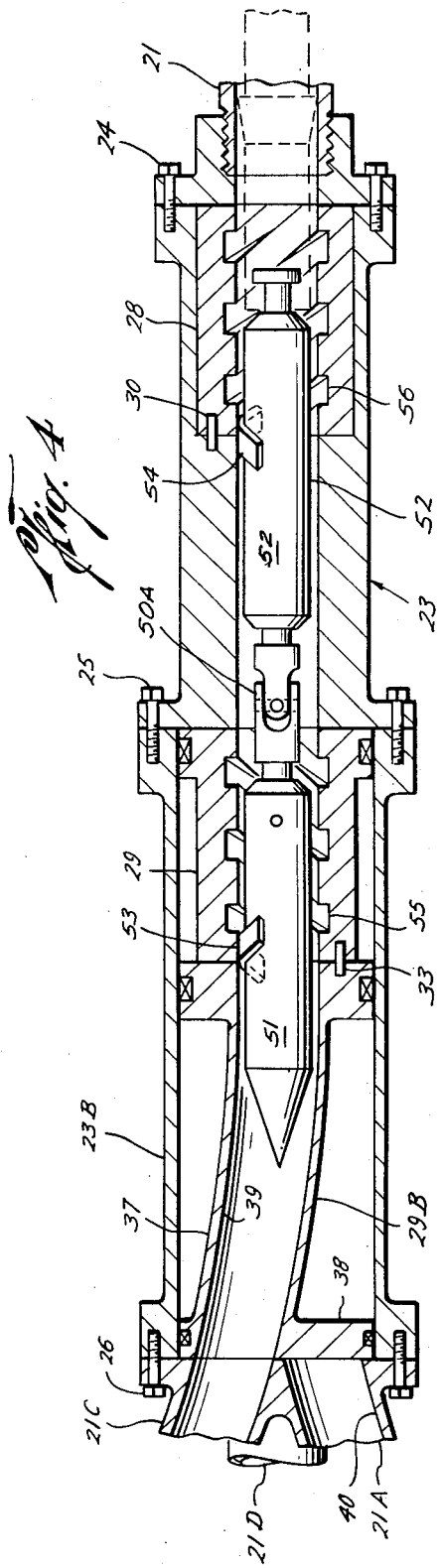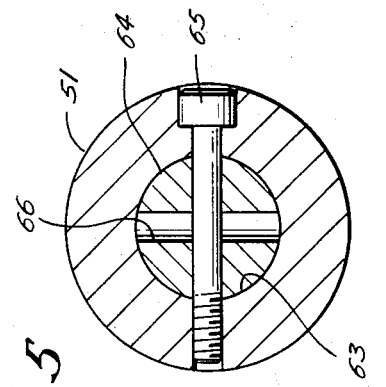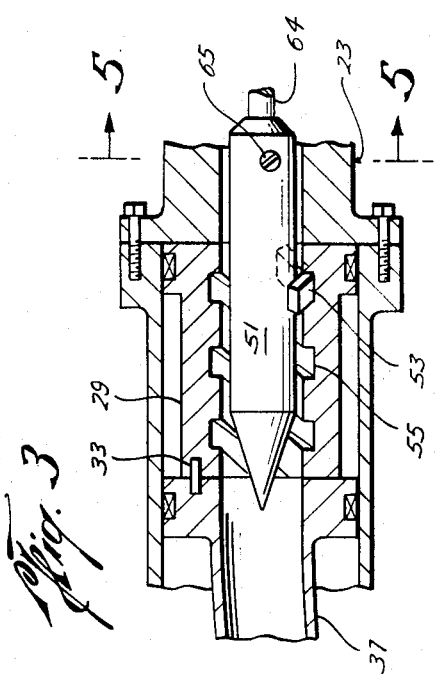

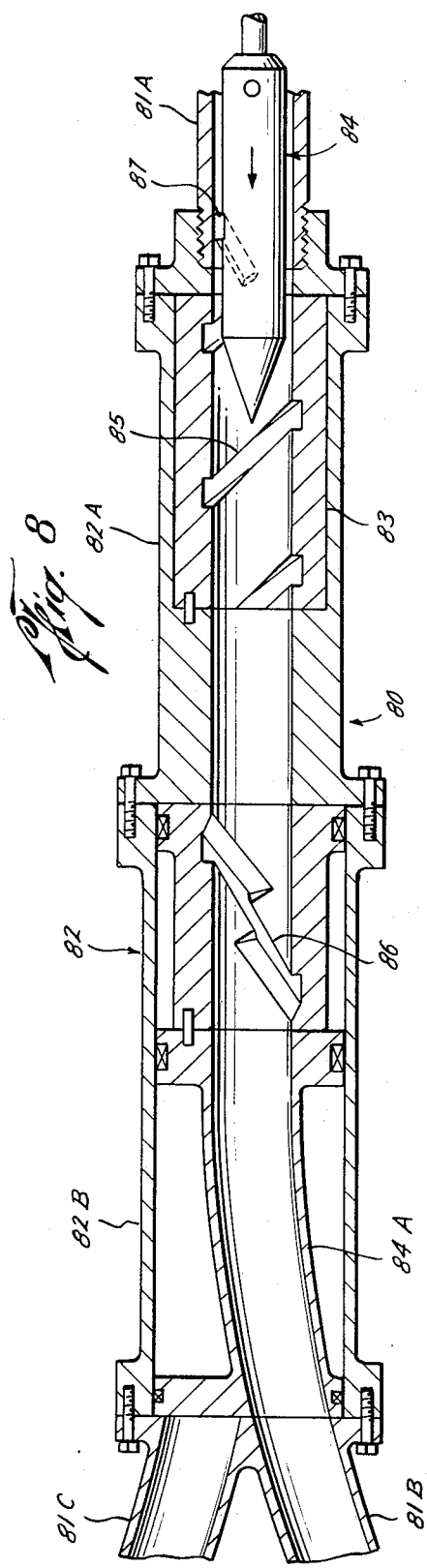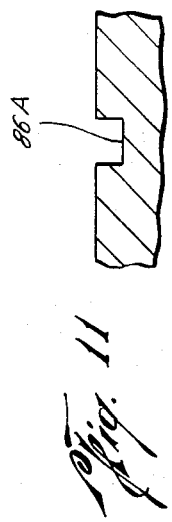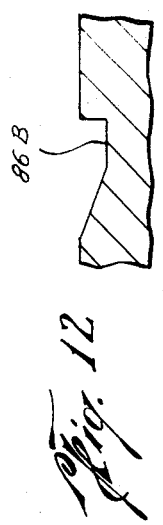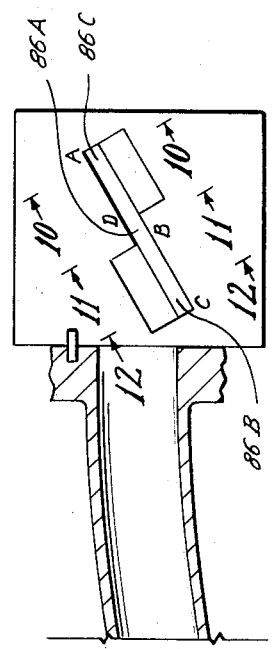

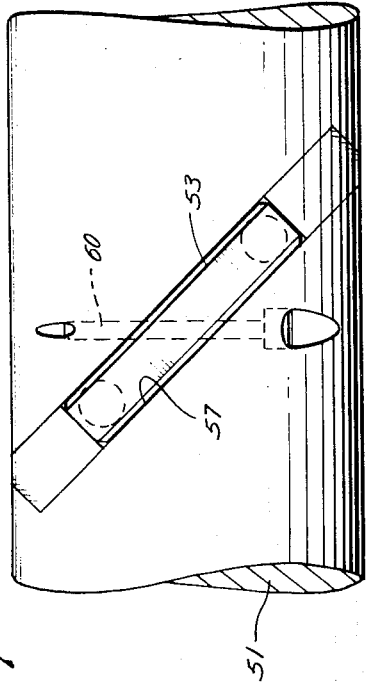
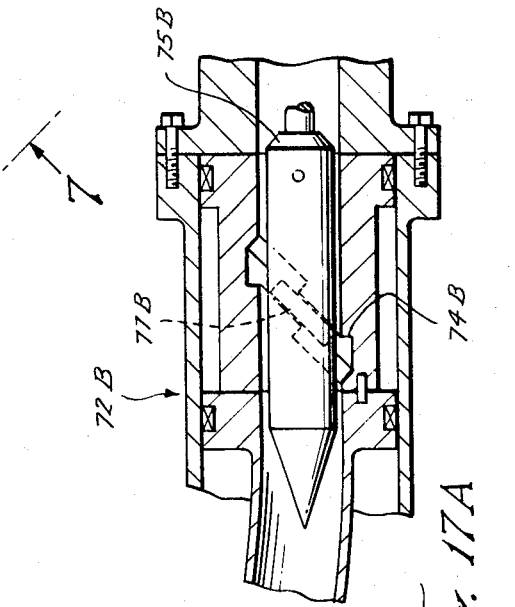
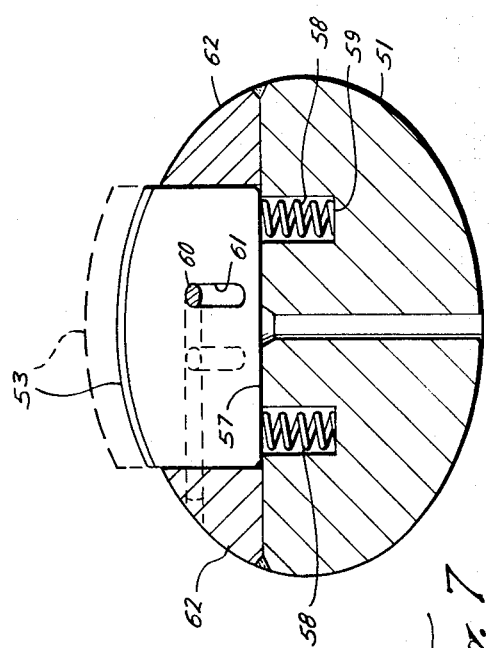
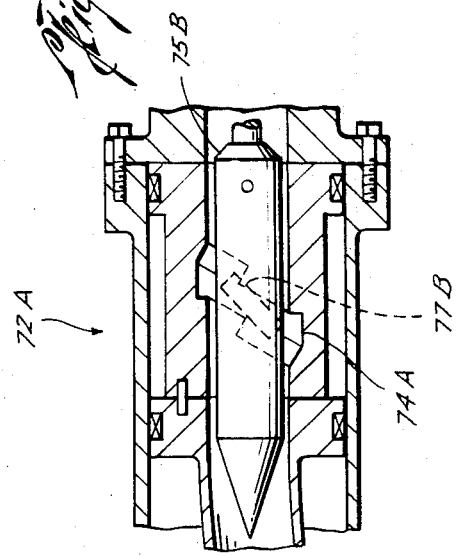
John V. Pennington
INVENTOR

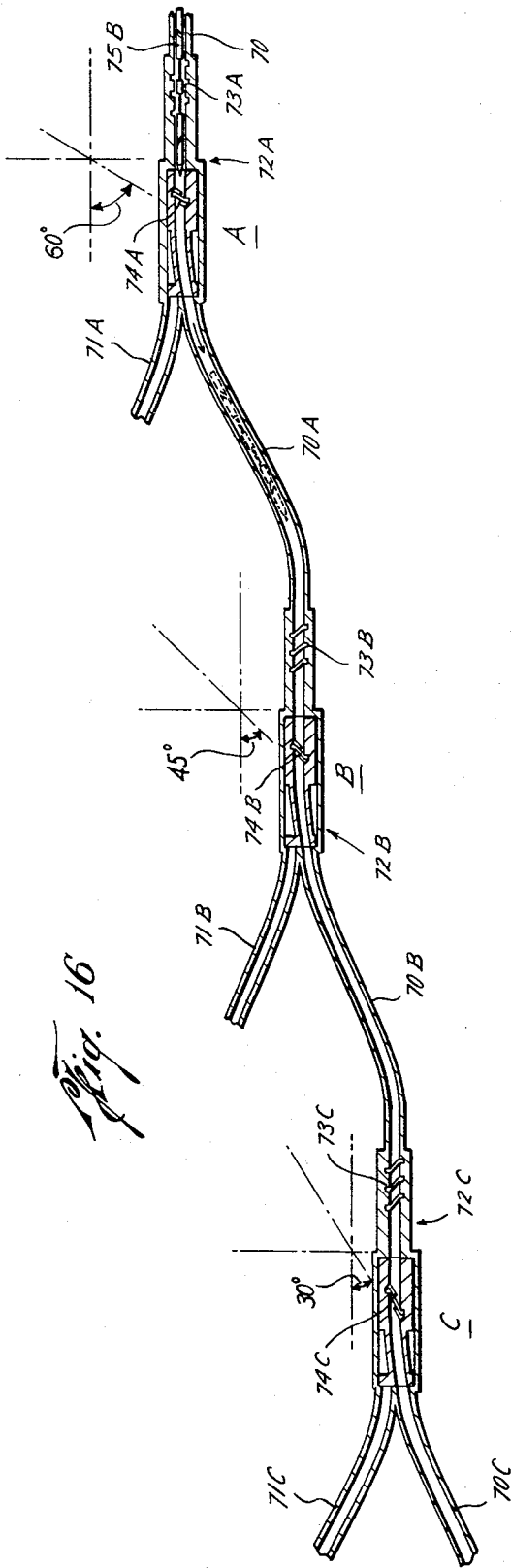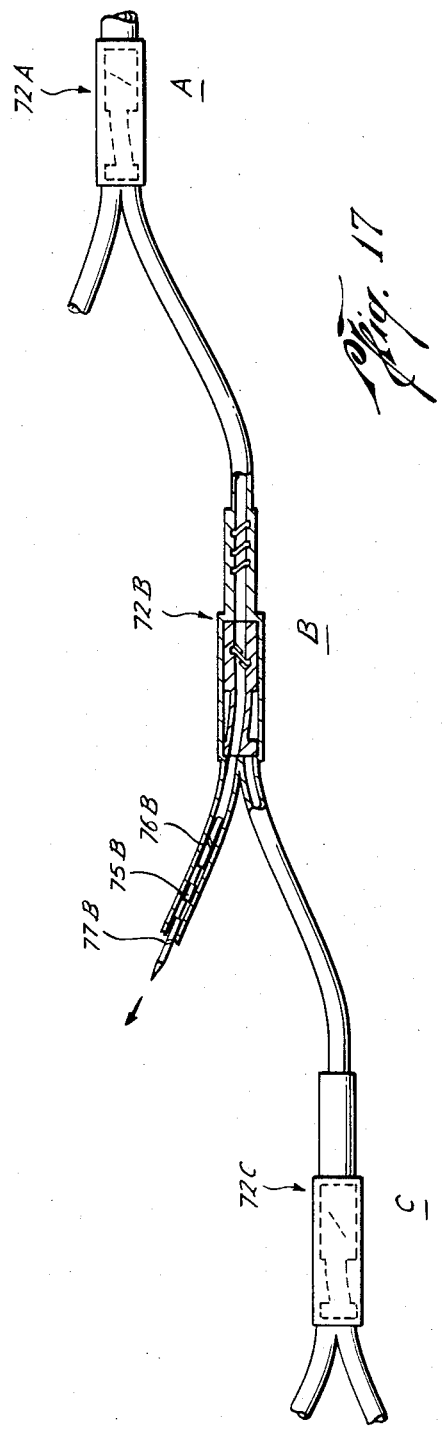

SWITCH

This is a continuation of application, Ser. No. 121,883, filed Mar. 8, 1971, now abandoned, by John. V. Pennington.

This invention relates to switches for fluidly connecting a pipeline with selected branch lines. More particularly, it relates to improvements in switches of this type adapted for use at locations which are relatively remote from normal power sources.

In the operation of an oil or gas well, it may be necessary to circulate various service tools to and from well tubing located a considerable distance from a production center. Ordinarily, these tools are propelled through pipelines leading to and from the well tubings by fluid acting on sealing cups on the tool slidable over the inner surface of the pipeline. In order to avoid the use of a separate line to each of several well tubings, it has been proposed to provide a common service pipeline connected by switches to branches each leading to and from a tubing. However, when these switches are at relatively remote locations, as in the case of an offshore well, it is impractical to operate them manually. Consequently, it has been the practice to do so by power from a remote source, which of course requires long power transmission lines subject to leakage, breakage and other malfunctions.

An object of this invention is to provide a switch of this type which may be operated, even though remotely, without the need for such power lines.

Another object is to provide a switch of the character described which may be used to selectively connect with any one of a plurality of branches.

Still another object is to provide switches of the character described each of which may be selectively used for connecting a common line with a branch line.

A further object is to provide such a switch which will be returned to its original position in response to reverse circulation thereof.

A still further object is to provide such switches in which the selection of the desired branch line may be controlled by the use of readily adjustable or interchangeable parts.

Yet another object is to provide a pipeline switch which is of rugged and dependable construction, and which is economical to install and operate.

These and other objects are accomplished, in accordance with the illustrated embodiments of the present invention, by a switch which comprises a first conduit adapted to be connected to one portion of a pipeline, and a second conduit shiftable between positions for selectively connecting the first conduit with either another portion of the pipeline or a branch from the pipeline. The switch also includes a tool which is adapted to pass through the conduits and has parts on it cooperable with parts on the conduits for shifting the second conduit from its position connecting with the other portion of the pipeline to its position connecting with the branch solely in response to passage of the tool through the conduits. Thus, in accordance with the broad object of the present invention, the switch is operated without the necessity for the usual power-transmitting lines.

For this purpose, a first part on the tool is engageable in torque-transmitting relation with only a part on the first conduit, and a second part on the tool is engageable in torque-transmitting relation with only a part on the second conduit, said parts being arranged relative to one another so as to rotate said second conduit relative to the first, and thus into connection with said branch, as the tool passes through the conduits with the parts on the tool and the conduits in simultaneous torque-transmitting engagement. In the illustrated embodiments of the invention, the parts on the tool comprise first and second keys, and the parts on the first and second conduits comprise spiral grooves to receive the first and second keys, respectively, with the first keys and conduits differing from the second keys and conduits in direction — i.e., left or right hand — and/or lead angles.

In one embodiment of the invention, the switch is adapted to connect a pipeline with one of a plurality of branches, each of which may connect with a separate well tubing. In this embodiment, the branch to be connected to the pipeline depends on the selection of the tool to be passed through the housing of the switch. Thus, the arrangement of the keys on the selected tool determine the extent to which the second conduit is rotated so as to bring it into connection with the desired branch as the keys are simultaneously engaged with the grooves in the first and second conduits.

In another embodiment of the invention, the switch is adapted to connect the pipeline with a single branch therefrom when a selected tool is passed through the housing thereof. Thus, a number of such switches may be disposed at spaced locations along the pipeline, with the branch from each connecting with one well tubing. The tool selects the switch to be operated by having keys engageable with grooves in both conduits of the selected switch, but engageable with grooves in less than both conduits of the unselected switches through which it must pass in reaching the selected switch.

Preferably, the second-mentioned switch embodiment is reversible in the sense that passage of the tool back through it will return it to its original position. For this purpose, the groove in the second conduit has a midportion with torque-transmitting parts on both sides thereof and end portions with a torque-transmitting surface on only the one side thereof engaged by the second key prior to engagement with said midportion. More particularly, the grooves in the conduit are so spaced that the trailing keys on the tool for operating the switch will always be engaged with the groove in the first conduit prior to engagement of the leading key with the torque-transmitting portions on the groove in the second conduit. Thus, the tool will, upon return passage through the conduits, rotate the second conduit back to the same position it occupied prior to rotation of the conduits or, if desired, to some other predetermined position, during its first passage therethrough.

The switches are made extremely versatile by enabling the torque-transmitting parts of the tools of the first-mentioned embodiment to be indexed into different rotative positions relative to one another, thereby adjusting them for rotating the second conduit into connection with a selected branch. Also, at least some of the parts of the tools and the conduits of a series of the second-mentioned switch embodiment may be identical, with selection for operating different switches being made on the basis of the other parts, thereby further simplifying inventory problems.

In the drawings, wherein like reference characters are used throughout to designate like parts;

FIG. 1 is a longitudinal sectional view of a switch constructed in accordance with the first-mentioned embodiment of the present invention, and showing a portion of the tool thereof as it first begins to move into the first conduit;

FIG. 2 is a view similar to FIG. 1, but showing the tool moving further into the conduits and with the trailing key thereon engaged in torque-transmitting relation with a groove in the first conduit;

FIG. 3 is another view of a part of the switch, but with the tool moved even further into the conduits and with the leading key thereon engaged in torque-transmitting relation with a groove in the second conduit;

FIG. 4 is still another view of the switch, but showing the tool moved still further, while near the end of torque-transmitting relation with grooves in the conduits;

FIG. 5 is an enlarged cross-sectional view of a portion of the tool, as seen along broken line 5—5 of FIG. 3;

FIG. 6 is a top plan view of a portion of the tool, again on an enlarged scale;

FIG. 7 is a cross-sectional view of the tool, as seen along broken line 7—7 of FIG. 6;

FIG. 8 is a longitudinal sectional view of a switch constructed in accordance with the second-mentioned embodiment of the invention, and showing the tool moved partially into the first conduit thereof;

FIG. 9 is a developed view of the groove in the second conduit of the switch of FIG. 8;

Figure 13:
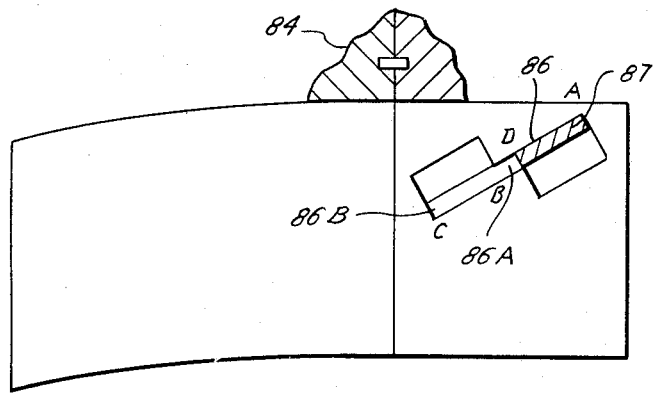
Figure 14:
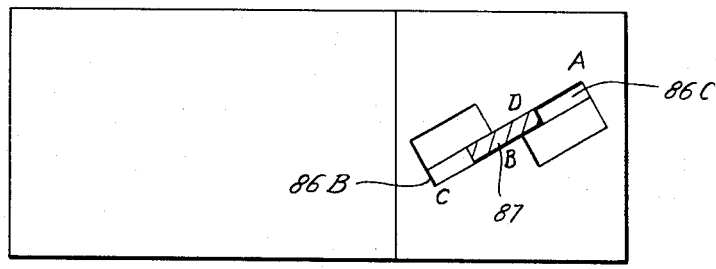
Figure 15:
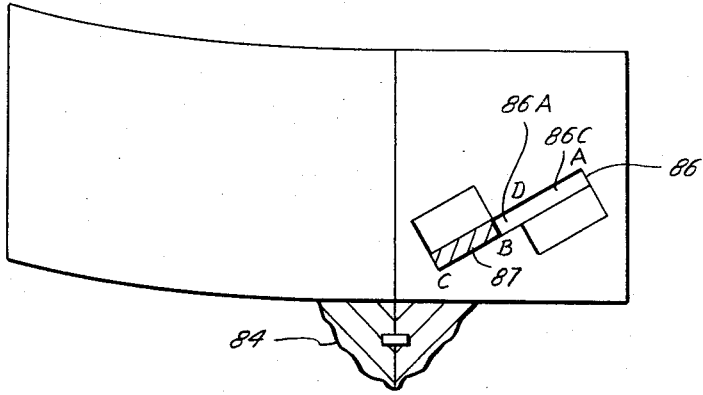

FIGS. 10, 11 and 12 are enlarged cross-sectional views of the groove in the second conduit of the switch, as seen along broken lines 10—10, 11—11 and 12—12, respectively, of FIG. 9;

FIG. 13 is a development of the bore through the second conduit, as the leading key on the tool first engages the groove;

FIG. 14 is a view similar to FIG. 13, but with the tool moved a further distance; and FIG. 15 is another view similar to FIG. 13, but with the key moved a still further distance to complete rotation of the second conduit;

FIG. 16 is a diagrammatic sectional view along the length of a pipeline having switches similar to those of FIGS. 8 – 15 at spaced locations therealong for connecting the pipeline with a branch at each such location, and showing a tool in solid lines as it moves partially into the first conduit of a first switch and in broken lines as it moves into the pipeline past the first switch;

FIG. 16A is an enlarged sectional view of the switch at the first location of FIG. 16, and showing in broken lines the leading key on the tool as it passes through the second conduit of the first switch;

FIG. 17 is a view similar to FIG. 16, but showing the tool upon passage through the conduits of the second switch, so as to rotate the second conduit thereof from the position of FIG. 16 to that of FIG. 17, and into the branch extending from the pipeline at the second location; and FIG. 17A is an enlarged longitudinal sectional view of the second switch showing in broken lines the leading key of the tool engaged with a groove in the second conduit thereof.

The first switch embodiment shown in FIGS. 1 to 7, and indicated in its entirety by reference character 20, includes a housing 23 connected at its right end to one end portion 21 of a pipeline and at its left end to the end portion 21A of the other pipeline and to branches 21B, 21C and 21D from the pipeline. Obviously, more or fewer branches may be provided, depending on the switching to be done, and those shown are merely illustrative. However, and as previously noted, this switch embodiment is particularly adapted for connecting the pipeline with two or more well tubings, so that ordinarily it will have at least two branches.

The housing includes a righthand section 23A having a flange on its outer end connected by bolts 24 to a flange on the end of pipeline portion 21, and a lefthand section 23B having a flange on its inner end connected by bolts 25 to a flange on the inner end of housing section 23A. A flange on the outer end of housing section 23A is connected by bolts 26 to a flange common to pipeline portion 21A and branches 21B–21D. As will be apparent from the drawings, the housing sections are coaxial with one another as well as with pipeline portion 21 and the center of a circle on which the axes of the ends of pipeline portion 21A and branches 21B–21D are disposed.

A first conduit 28 is axially removably received within a counterbore in the righthand end of a bore 32 through housing section 23A and is fixed therein against rotation by means of a pin 30. A bore 31 through the conduit 28 forms a continuation of bore 32 and both form a continuation of the bore through pipeline portion 21.

A second conduit 29 is axially removably received and rotatable within the housing section 23B. It includes a righthand portion 29A and a lefthand portion 29B connected for rotation with one another by means of a pin 33 and held in end-to-end abutment between the flange on the left end of housing section 23A and the flange common to pipeline portion 21A and branches 21B–21D.

A flange 35 at the righthand end of second conduit portion 29A fits closely within the right end of housing section 23B, and flanges 36 and 38 on the ends of second conduit portion 29B fit closely within the midportion and left end of housing section 23B, respectively. A gently curved tube 37 extends between the flanges 36 and 38 with its right end coaxial with flange 36 and its left end eccentric of the flange 38. Bores 34 and 39 through the conduit portion 29A and the tube 37 of conduit portion 29B form continuations of one another as well as the bores through housing section 23A.

Annular seals (not shown) may be provided between the abutting flanges on the ends of pipeline portion 21 and housing sections 23A and 23B and the flange common to the end of pipeline portion 21A and branches 21B–21D. Also, for the purpose to be described in detail, bearings 41, 42 and 43 are carried by the flanges 35, 36 and 38 to facilitate rotation of second conduit 29 about its axis within housing section 23B, so as to selectively bring the left end of tube 37 into alignment with the bore through each of the pipeline portion 21A and branches 21B–21D.

The tool for passage through the conduits 28 and 29, and indicated in its entirety by reference character 50, comprises portions 51 and 52 interconnected by a swivel joint 50A. As indicated diagrammatically in the drawings, joint 50A is of a type which transmits torque between the portions 51 and 52 by preventing them from rotating with respect to one another about their respective longitudinal axes. Assuming movement of the tool from right to left, as illustrated in the drawings, pipeline portion 21 is upstream and pipeline portion 21A is downstream, and tool portion 51 is "leading" and tool portion 52 is "trailing".

Each of the leading and trailing portions of the tool 50 is generally cylindrical in cross section and of a size to fit fairly closely within the continuous bores through the pipeline, conduits and branches. In the illustrated embodiment of the invention, the tool 50 is disposed forwardly of another tool, indicated in broken lines in each of FIGS. 2 and 4 and connected to the trailing end of the tool 50 by a suitable coupling. The trailing tool is provided with one or more rubber cups (see FIG. 4) which are rearwardly divergent and sealably engage the bores so as to be moved in response to the pressure of fluid flowing from right to left in the drawings, and thus in a downstream direction.

As best shown in FIGS. 2 and 4, the tool 50 is of such length as to locate the leading and trailing portions 51 and 52 within the portion 29A of the second conduit 29 and the first conduit 28, respectively, during at least one stage of the tool's passage through the switch housing 23. Thus, as previously mentioned, parts on these leading and trailing portions may cooperate with parts on the conduits to rotate the second conduit with respect to the first conduit, and thereby move the downstream end of the second conduit from alignment with the pipeline portion 21A into alignment with a selected one of the branches 21B-21D.

As also previously described, the cooperating parts on the tool and conduits comprise outwardly spring-pressed keys 53 and 54 on the leading and trailing portions of the tool, respectively, and grooves 55 and 56 within the second and first conduits 29 and 28, respectively. Thus, the key 53 is arranged to fit within the grooves 55 and the key 54 arranged to fit within the grooves 56, and, more particularly, the keys are arranged to engage both grooves for a sufficient interval to cause the second conduit to be rotated relative to the first conduit to the desired extent.

As previously described, grooves 55 and 56 are generally helical threads having dissimilar lead angles, which may be positive or negative — i.e., righthand or lefthand. One of the grooves may even have a 90° lead angle and thus be parallel to the axis of the conduit. It is also possible for both grooves to be righthand or lefthand, but of different lead angle. In the illustrated switch 23, the grooves 56 are of negative 45° lead angle and the grooves 55 are of positive 45° lead angles.

In the illustrated switch 23, there are two grooves 55 in conduit 28 and two grooves 56 in conduit 29, each extending about at least 360° of the conduit into which it is formed. Thus, there are at least two revolutions of grooves in each conduit to insure engagement of the keys 53 and 54 with both grooves 55 and 56, respectively, for a sufficient interval to rotate the second conduit the desired extent relative to the first conduit. That is, in the switch 23, there is no way to predict which key will engage its respective groove first, and it is conceivable that neither key would be engaged until both keys had passed one of the grooves with which it is to engage, and further that the second key to engage would require a similar and subsequent extent of axial movement before engaging a groove.

As also previously described, the engagement of keys 53 and 54 in torque-transmitting relation with the grooves 55 and 56, respectively, establishes the angular relationship of the first and second conduits relative to one another. This relationship is maintained as the tool passes through the conduits until key 54 disengages from groove 56, or key 53 disengages from groove 55, and this in turn establishes the final angular position of the second conduit with respect to pipeline portion 21, and thus with respect to pipeline portion 21A and branches 21B-21D.

That is, when a key disengages, there is no longer any transmission of torque between the first and second conduits, so that the tool 50 will merely continue to pass through the conduits without causing relative rotation between them. Thus, it makes no difference whether or not one key is still engaged with a groove, because even if it is, the result would merely be rotation of the tool without rotation of second conduit 29, inasmuch as the friction between the tool and groove is less than that between the second conduit and housing section 23A. As a matter of fact, and as will be apparent from the drawings, in the illustrated embodiment of switch 23, the keys 53 and 54 may be made to disengage from their respective grooves substantially simultaneously, thereby avoiding any tendency of the forward motion of the tool to rotate the second conduit beyond the position to which it has been rotated by transmission of torque between the first and second conduits.

As previously described, the keys 53 and 54 are outwardly spring-pressed so that they will be compressed inwardly to slide within the continuous bores through the switch housing except when each is aligned with a groove with which it is adapted to cooperate. At that time, the key will spring outwardly into the groove and follow its spiral path until reaching the end of the groove, at which time the key will be compressed inwardly for sliding within the remainder of the bores.

Thus, as shown in FIGS. 6 and 7, the key 53 is received within a diagonal slot 57 in the leading portion 51 of the tool 50 for guided movement between an inner position in which its outer curved edge projects just slightly from a continuation of the outer diameter of the portion 51, and an extended position in which its outer edge projects a substantial distance from the outer diameter of the portion 51, as indicated by broken lines in FIG. 7. Thus, in the inner position, the key will slide within the bores through the switch, and in the outer portion, the key 53 projects outwardly a sufficient distance to engage within groove 55. The key 53 is urged outwardly by a pair of coil springs 58 received within cavities 59 in the bottom of the slot 57. A pin 60 extends laterally through holes in the portion 51 of the tool and across the slot 57 so as to pass through a slot 61 formed through the key 53 and aligned within the holes. The vertical extent of the slots 61 determines the above-described outer and inner positions of the key 53.

As will be apparent from FIGS. 6 and 7, the slot 57 is preferably formed by milling the slot across the leading portion 51 and then filling opposite ends of the milled slot with stops 62 to form the end walls of the slot 57. The stops 62 are welded or otherwise secured to the main portion of the tool body. The upper edges of the key 53 may be chamfered, as shown, for facilitating entry into and removal from the grooves in the conduits.

The key 54 may be constructed and mounted on the trailing portion 52 of the tool 50 in the manner described above with respect to key 53. The leading portion 51 of the tool 50 differs from the trailing portion 52 in that it is connected to the swivel joint 50A in such a manner as to permit it to be rotatably indexed with respect thereto, and thus with respect to the trailing portion 52, approximately 90°, 180° or 270° from the position shown in the drawings. This, of course, changes the relationship of the second conduit with respect to the first conduit upon rotation of the second conduit into a desired position, so that the switch 23 may selectively rotate the second conduit into connection with any one of pipeline portion 21A and branches 21B–21D.

Thus, as shown in FIG. 5, there is a socket 63 in the rear end of the leading portion 51 which receives a stem 64 extending forwardly from the front end of the swivel joint 50A, and the stem is normally secured to the leading portion by a pin 65 extending through aligned holes in each. The stem 64 is also provided with additional hole 66 therethrough so that the pin 65 may be removed, the stem rotated to align holes 66 with that in the leading tool portion 51, and the pin 65 inserted into the aligned holes.

The switch illustrated in FIGS. 8 to 15, and indicated in its entirety by reference character 80, includes a housing 82 disposed between an upstream portion 81A of a pipeline and a downstream pipeline portion 81B thereof and a branch 81C therefrom. It also includes a tool 84 adapted for passage through the housing and cooperation with conduits therein, during such passage, for moving them to positions connecting the pipeline portion 81A with the branch 81C as the tool passes through the conduits.

However, as previously mentioned, and as will be understood from the description to follow of FIGS. 16, 16A, 17 and 17A, in this embodiment of the invention, the tool 84 and conduits within housing 82 may be of such construction as to permit the tool to pass therethrough without connecting pipeline portion 81A with branch 81C. In this event, the tool 84 would instead pass from the housing conduits into the pipeline portion 81B, and would continue to pass through the pipeline until reaching another switch having conduits with which it is adapted to cooperate for connecting the pipeline with a branch at the location of such other switch.

As will be apparent from FIG. 8, the switch housing 82 is very similar in construction to the housing of the switch 23 of FIGS. 1 to 7. Thus, it has flanges on its opposite ends for connection to a flange on pipeline portion 81A and a flange common to pipeline portion 81B and branch 81C. Also, the housing is made up in releasably connected righthand and lefthand sections 82A and 82B, with a first conduit 83 supported in the righthand housing section and second conduit 84A supported in the lefthand section, and with bores through the conduits aligned with one another and the pipeline portion 81A and pipeline portion 81B or branch 81C. More particularly, each such conduit is axially removable from its housing section, first conduit 83 is fixed against rotation with respect to the housing section 82A, and thus with respect to the pipeline portion 81A, and second conduit 84A is supported within housing section 82A for rotation about its axis between the position of FIG. 8, wherein it connects pipeline portion 81A with pipeline portion 81B, and a position 180° therefrom so as to connect pipeline portion 81A with branch 81C.

As in the case of the switch 23, the tool 84 of the switch 80 has an outer diameter somewhat less than that of the bores through the housing, pipeline portions 81A and 81B, and branch 81C. As shown in FIG. 8, there is a spiral groove 85 in the first conduit 83 and a spiral groove 86 in the conduit 84A, which are of opposite hand and extend at lead angles of 45° with respect to the common axis of the conduits, so that the leading key 87 and a trailing key (not shown) on the leading and trailing portions, respectively, of the tool 84 may be identical to those of the tool 50 of the switch 23.

Switch 80 is of such construction that the conduit 84A of the housing is returned to its original position upon return movement of the tool 84 therethrough — i.e., from the branch 81C into the pipeline portion 81A. Thus, upon reverse circulation of fluid, the tool may be returned through the pipeline to operate the switch to its original position connecting pipeline portion 81A with pipeline portion 81B.

For this purpose, and as can be seen from FIG. 8, groove 85 consists of about two revolutions within first conduit 83 and is spaced from the groove 86 within second conduit 84A a distance which assures that the trailing key on the tool 84 will engage the groove 85 before the leading key 87 engages groove 86. Thus, despite the orientation of tool 84 as it enters switch housing 82, it will be oriented into a desired position before the leading key 87 engages groove 86, and thus be in a predetermined orientation, as it moves into groove 86 of second conduit 84A.

As shown in FIG. 9, groove 86 includes a midportion 86A (intermediate points B and D) which has parallel upright walls on both sides thereof, whereby disposal of the key 87 therein will transmit torque to the second conduit regardless of the direction in which the tool 84 is moving. The groove also includes end portions 86B (intermediate points B and C) and 86C (intermediate points A and D), each of which has, as distinguished from the midportion of the groove, an upright torque-transmitting wall on only one side thereof. The other side of the groove of each such end portion is instead sloped to prevent the key from transmitting torque during movement of the tool 84 in one direction, with the sloping walls of such end portions extending in opposite directions.

Thus, as best seen in FIG. 11, when tool 84 is moving from right to left, key 87 is in torque-transmitting relationship with the groove from A to B, and, when moving from left to right, from C to D. Obviously, by adjustment of the relative positions of A, B, C and D, second conduit 84A may be caused to rotate a desired amount when tool 84 moves to the left and rotated back a desired amount when the tool moves to the right. In particular, in the illustrated switch, second conduit 84A may first be rotated 180° to connect with branch 81C and then rotated back to leave it in its original position connected with pipeline portion 81B.

Thus, upon return movement of the tool from within branch 81C into pipeline portion 81A, the trailing key of the tool 84, which is now leading insofar as direction is concerned, will first engage in torque-transmitting relation with the groove 85 so as to orient the tool 84 into a predetermined position with respect to the conduit as its leading (now trailing) key 87 engages the upright wall of end portion 86B of the groove 86. The key 87 will continue to move in force-transmitting relation over the upright walls of the groove end portion 86B and midportion 86A, thus providing a combined length equal to the combined lengths of the driving surfaces of the portions 86A and 86B so as to rotate the second conduit 180°. Then, as the key 87 moves past midportion 86A, it will contract over the sloping surface of 86C and thereby discontinue transmitting torque to the second conduit 84.

In order to permit tool 84 to be moved in this reverse fashion, it may be provided with additional sealing cups thereabout facing in a direction opposite to those previously described, whereby the pressure of fluid exerted from left to right is effective to move the tool from left to right, as shown in FIG. 8.

The pipeline illustrated in FIGS. 16 and 17, is made up of portions 70, 70A, 70B and 70C having branches 71A, 71B and 71C extending therefrom at locations A, B and C. Switches 72A, 72B and 72C are provided at locations A, B and C, respectively, each for selectively connecting the portion of the pipeline upstream of it with the branch extending therefrom upon passage therethrough of a selected tool.

As illustrated diagrammatically in FIGS. 16 and 17, each of these switches is similar in construction and function to the switch 80. Thus, switch 72A has grooves 73A and 74A in its first and second conduits, respectively, switch 72B has grooves 73B and 74B in its first and second conduits, respectively, and switch 72C has grooves 73C and 74C in its first and second conduits, respectively, each for cooperation with a selected tool during passage therethrough.

As previously described, the pipeline may comprise a common line for tools adapted to service various well tubings, and each of the branches 71A, 71B and 71C may lead to an individual well tubing. In the event the pipeline is to be connected to the branch 71A, a tool is selected for cooperation with the conduits of the switch 72A for rotating the switch from its illustrated position (connecting pipeline portion 70 with pipeline portion 70A) to a position (not shown) connecting pipeline portion 70 with branch 71A.

If the pipeline is instead to be connected with branch 71B, a tool 75B is selected for passing through the conduits of switch 72A without causing them to rotate relatively to one another, whereby the tool will pass into pipeline portion 70A. As indicated, this tool has keys 76B and 77B for engaging grooves 73B and 74B, respectively, of switch 72B so as to rotate the second conduit thereof from a position connecting with the pipeline portion 70B (FIG. 16) to a position connecting with branch 71B (FIG. 17). Thus, as previously described, the tool will pass through the conduits of switch 72B into the branch 71B.

In the event the pipeline is instead to be connected with the branch 71C, a tool would be selected for not only passing through the conduits of switch 72A without causing relative rotation therebetween, but also for passing through the conduits of the switch 72B without rotating them relative to one another. Consequently, the second conduit of the switch 72B would also remain in the position shown in FIG. 16 in which it connects with the pipeline portion 70B. Then, when the selected tool reached the conduits of the switch 72C, it would engage each in torque-transmitting relation so as to rotate the second conduit thereof to a position connecting with the branch 71C, and thus pass from the conduits into the branch 71C.

The switch 72B may be identical to the switch 80 previously described in that the grooves 73B and 74B in the first and second conduits thereof are of opposite hand and arranged at 45° lead angles with respect to the common axis of the conduits, and further in that the keys 76B and 77B on the tool 75B are also of opposite hand and arranged at 45° lead angles so as to engage simultaneously the grooves 74B and 73B, respectively. Thus, as described in connection with switch 80, the tool 75B will during passage through the conduits, transmit torque between them in order to rotate the second conduit 74B from the position of FIG. 16 to the position of FIG. 17.

In order to prevent the selected tool 75B from rotating the second conduit of the switch 72A from the position of FIG. 16, the groove 74A in the second conduit of such switch is arranged at a lead angle of 60° with respect to the common axis of the conduits. Thus, as shown in FIG. 16A, the leading key 77B of the tool 75B will not engage within the groove 74A, but instead will merely pass through the conduit 74A.

In the illustrated embodiment of the invention, the grooves 73A in the first conduit of the switch 72A are of the same hand and at the same lead angle as the grooves 73B of the switch 72B, so that the trailing key 76B will engage the grooves 73A of the second conduit, as the tool 75B passes through the conduits of switch 72A. However, since there's no engagement between the leading key 77B and the groove 74A, no torque is transmitted from the first conduit to the second conduit. Consequently, in the illustrated embodiment of the invention, it's possible to provide switches 72A and 72B with identical first conduits as well as tools for operating these switches having identical trailing portions.

As shown in FIGS. 16 and 17, the grooves 74C in the second conduit of the switch 72C are disposed at a third lead angle with respect to the common axis of the conduits, which in this case is 30°. In keeping with the advantage of providing switches having conduits and tools with common parts, the grooves 73C in the first conduit of the switch 72C are right hand and disposed at a lead angle of 45° to the common axis of the conduits.

As will be appreciated from the foregoing description, if the switch 72C is to be operated so as to move the second conduit thereof from a position connecting with pipeline portion 70C to a position connecting with branch 71C, a tool (not shown) would be selected which has a leading key adapted to engage only with the groove 74C in torque-transmitting relation. Since the angle of the groove 74C is different from the angles of the grooves 74B and 74A, the leading key on the selected tool would pass through the second conduits of the switches 72A and 72B without engaging the grooves thereof, and thus without causing the second conduit of either to rotate with respect to the first conduit thereof. However, as the tool passed into the conduits of the switch 72C, the keys thereon would simultaneously engage with the grooves 73C and 74C so as to rotate the second conduit into a position for connecting pipeline portion 70B with the branch 71C as the tool passes through the conduits.

It will be understood that while the above-described selections of the switch to be operated is accomplished by a difference in the leading keys on the tools and the grooves in the second conduit, such selection could instead be made by differences in the trailing keys and the grooves in the first conduits, or by differences in both. Ordinarily, however, the illustrated embodiment would be preferred in that it would avoid any tendency to rotate the second conduit due to frictional engagement of the keys with the grooves in the second conduit.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A switch for fluidly connecting a pipeline with a branch from the pipeline, comprising a first conduit adapted to be connected with the end of one portion of the pipeline, a second conduit shiftable between first and second positions for connecting the first conduit with either the end of another portion of the pipeline or the end of the branch, respectively, a tool adapted to pass through the conduits, and means on the tool cooperable with means on each of said conduits to selectively shift said second conduit to either of said first or second positions in response to passage of said tool through said conduits.

2. A switch for fluidly connecting a pipeline with one of a plurality of branches from the pipeline, comprising a first conduit adapted to be connected with the end of one portion of the pipeline, a second conduit shiftable between first and second positions for connecting the first conduit with either the end of another portion of the pipeline or the end of a selected one of the branches, respectively, a tool adapted to pass through the conduits, and means on the tool cooperable with means on each of said conduits to selectively shift said second conduit to either of said first or second positions in response to passage of said tool through said conduits.

3. A switch for fluidly connecting a pipeline with a branch from the pipeline, comprising a first conduit adapted to be connected with the end of one portion of the pipeline, a second conduit shiftable between first and second positions for connecting the first conduit with either the end of another portion of the pipeline or the end of the branch, respectively, a tool adapted to pass through the conduits, and means on the tool cooperable with means on each of said conduits to selectively shift said second conduit from said first position to said second position, in response to passage of said tool in one direction through said conduits, and from said second position to said first position, in response to passage of said tool in the opposite direction through said conduits.

4. A switch for fluidly connecting a pipeline with a branch from the pipeline, comprising a first conduit having one end adapted to be connected in alignment with the end of one portion of the pipeline, a second conduit having one end aligned with the other end of the first conduit and rotatable about the axis of said other end and with respect thereto between first and second positions for disposing the other end of the second conduit in alignment with either the end of the other portion of the pipeline or the end of the branch, a tool adapted to pass through the conduits, and means on the tool cooperable with means on each of said conduits to selectively rotate said second conduit to either of said first or second positions in response to passage of said tool through said conduits.

5. A switch of the character defined in claim 4, wherein the means to rotate the second conduit comprises a first part on the tool engageable in torque-transmitting relation with a part on only the first conduit, and a second part on the tool engageable in torque-transmitting relation with a part on only the second conduit, said parts being arranged relative to one another to so rotate said second conduit during torque-transmitting engagement of said parts on the tool with both said parts on the conduits.

6. A switch of the character defined in claim 5, wherein said parts on the tool comprise keys and said parts on the conduits comprise spiral grooves to receive the keys.

7. A switch of the character defined in claim 5, including means on the tool for rotatably indexing said first and second parts relative to one another.

8. A switch of the character defined in claim 5, including means on the tool flexibly connecting said first and second parts.

9. A switch for fluidly connecting a pipeline with a branch from the pipeline, comprising a first conduit having one end adapted to be connected in alignment with the end of one portion of the pipeline, a second conduit having one end aligned with the other end of the first conduit and rotatable about the axis of said other end and with respect thereto between first and second positions for disposing the other end of the second conduit in alignment with either the end of another portion of the pipeline or the end of the branch, respectively, a tool adapted to pass through the conduits, and means on the tool cooperable with means on each of said conduits to selectively rotate said second conduit from said first to said second position, in response to passage of said tool in one direction through said conduits, and from said second position to said first position, in response to passage of said tool through said conduits in the opposite direction.

10. A switch of the character defined in claim 9, wherein the means to rotate the second conduit comprises a first part on the tool engageable in torque-transmitting relation with a part on only the first conduit, and a second part on the tool engageable in torque-transmitting relation with a part on only the second conduit, said parts being arranged relative to one another to so rotate said second conduit during torque-transmitting engagement of said parts on the tool with both said parts on the conduits.

11. A switch of the character defined in claim 10, wherein said parts on the tool comprise keys and said parts on the conduits comprise spiral grooves to receive the keys.

12. A switch of the character defined in claim 11, wherein the groove in the second conduit has a midportion with torque-transmitting surfaces on both sides thereof and end portions each with a torque-transmitting surface on only the side thereof adapted to be engaged by said second key prior to engagement with said midportion.

13. Apparatus for fluidly connecting a pipeline with one of a plurality of branches at spaced locations along the pipeline, comprising a switch for each location, each switch comprising a first conduit adapted to be connected with the end of one portion of the pipeline, a second conduit shiftable between first and second positions for connecting the first conduit with either the end of another portion of the pipeline or the branch at such location, respectively, and a tool adapted to pass through the pipeline and having means thereon cooperable with means on each of the conduits of only a selected one of the switches to shift the second conduit of said selected switch from said first to said second positions in response to passage of said tool through the conduits thereof.

14. Apparatus of the character defined in claim 13, including a second tool adapted to pass through the pipeline and having means thereon cooperable with means on each of the conduits of only a second selected switch to shift the second conduit of the second selected switch from said first position to said second position in response to passage of said tool through the conduits thereof.

15. Apparatus for fluidly connecting a pipeline with one of a plurality of branches at spaced locations along the pipeline, comprising a switch for each location, each switch comprising a first conduit having one end adapted to be connected in alignment with the end of the portion of the pipeline upstream of said location, a second conduit having one end aligned with the other end of the first conduit and rotatable about the axis of said other end and with respect thereto between first and second positions disposing the other end of the second conduit in alignment with either the end of the pipeline portion downstream of said location or the branch at said location, respectively, a tool adapted to pass through the pipeline and the conduits of each switch, and means on the tool cooperable with means on each of the conduits of only a selected one of the switches to rotate the second conduit of said one switch from said first to said second position in response to passage of said tool through the conduits thereof.

16. Apparatus of the character defined in claim 15, wherein the means to rotate the second conduit of the selected switch comprises a first part of the tool engageable in torque-transmitting relation with a part on only the first conduit of said selected switch, and a second part on the tool engageable in torque-transmitting relation with a part on only the second conduit of said selected switch, said parts being arranged relative to one another to so rotate said second conduit during torque-transmitting engagement of said parts on the tool with both said parts on the conduits.

17. Apparatus for fluidly connecting a pipeline with one of a plurality of branches at spaced locations along the pipeline, comprising a switch for each location, each switch comprising a first conduit having one end adapted to be connected in alignment with the end of the portion of the pipeline upstream of said location, a second conduit having one end aligned with the other end of the first conduit and rotatable about the axis of said other end and with respect thereto between first and second positions disposing the other end of the second conduit in alignment with either the end of the pipeline portion downstream of said location or the branch at said location, respectively, a plurality of tools each adapted to pass through the pipeline and conduits of each switch, and means on each tool cooperable with means on each conduit of one selected switch to shift the second conduit of said one switch from first to second position in response to passage of said each tool through the conduits.

18. A switch for fluidly connecting a pipeline with a branch from the pipeline, comprising a first conduit having means thereon adapted to be connected in sealed alignment with the end of one portion of the pipeline, a second conduit in sealed alignment with the first conduit and having means thereon shiftable between first and second positions for disposal in sealed alignment with either the end of another portion of the pipeline or the end of the branch, respectively, a tool adapted to pass through the conduits, and means on the tool cooperable with means on each of said conduits to selectively shift said second conduit to either of said first or second positions, in response to passage of said tool through said conduits, in which it remains after such passage.

19. A switch for fluidly connecting a pipeline with a branch from the pipeline, comprising a first conduit having means on one end adapted to be connected in sealed alignment with the end of the pipeline, a second conduit having one end sealably aligned with the other end of the first conduit and rotatable about the axis of said other end and with respect thereto between first and second positions for disposing means on the other end of the second conduit in sealed alignment with either the end of the other portion of the pipeline or the end of the branch, a tool adapted to pass through the conduits, and means on the tool cooperable with means on each of said conduits to selectively rotate said second conduit to either of said first and second positions, in response to passage of said tool through said conduits, in which it remains after such passage.

20. A switch for fluidly connecting a pipeline with a branch from the pipeline, comprising a member adapted to be connected to the pipeline, a conduit shiftable with respect to said member between first and second positions for connecting one portion of the pipeline with either another portion of the pipeline or the branch, a tool adapted to pass through the conduit, and means on the tool cooperable with means on the member and conduit to force said conduit selectively from said first to said second position or from said second to said first position in response to such passage.

21. A switch of the character defined in claim 20, wherein said conduit remains in the position to which it is forced until forced therefrom in response to another passage of a tool therethrough.

22. A switch of the character defined in claim 20, wherein said member is another conduit connectible in sealed alignment with said one portion of the pipeline and said first-mentioned conduit.

23. A switch for fluidly connecting a pipeline with a branch from the pipeline, comprising a member adapted to be fixed against rotation with respect to the pipeline, a conduit rotatable with respect to said member between first and second positions for connecting one portion of the pipeline with either another portion of the pipeline or the branch, a tool adapted to pass through the conduit, and means on the tool cooperable with means on the member and conduit to rotate said conduit selectively from said first to said second position or from said second to said first position in response to such passage.

24. A switch of the character defined in claim 23, wherein said conduit remains in the position to which it is rotated until rotated therefrom in response to another passage of a tool therethrough.

25. A switch for fluidly connecting a pipeline with a branch from the pipeline, comprising conduit means having one end adapted to be connected in alignment with one portion of the pipeline and its other end movable between positions for disposing it in alignment with either another portion of the pipeline or the branch, a tool adapted to pass through the conduit means from one pipeline portion to the other pipeline portion or to the branch, and means for moving said conduit means selectively from either position to the other in response to passage of said tool through said conduit means, said conduit means remaining in the position to which it is moved until moved therefrom in response to passage of another tool therethrough.

26. A switch of the character defined in claim 25, wherein said moving means includes means on the tool engageable with means on the conduit means for forcing said conduit means selectively from either position to the other.

27. A switch for fluidly connecting a pipeline with a branch from the pipeline, comprising conduit means having one end adapted to be connected in alignment with one portion of the pipeline and its other end movable between first and second positions disposing it in alignment with either another portion of the pipeline or the branch, a tool adapted to pass through the conduit means, and means to shift said conduit means from said first position to said second position, in response to passage of said tool in one direction through said conduit means, and from said second position to said first position, in response to passage of said tool in the opposite direction through said conduit means.

28. A switch of the character defined in claim 27, wherein said moving means includes means on the tool engageable with means on the conduit means for forcing said conduit means between said first and second positions.

29. A switch of the character defined in claim 27, wherein said conduit means remains in the position to which it is shifted until shifted therefrom in response to passage of another tool therethrough.

30. A switch for fluidly connecting a pipeline with a branch from the pipeline, comprising conduit means having one end adapted to be connected in alignment with one portion of the pipeline and its other end movable between first and second positions for disposing it in alignment with either another portion of the pipeline or the branch, a tool adapted to pass through the conduit means from one pipeline portion to the other pipeline portion or to the branch, and means on the tool cooperable with means on the conduit means for moving said conduit means selectively from said first position to said second position or from said second position to said first position in response to passage of said tool through said conduit means.

31. A switch of the character defined in claim 30, wherein said moving means includes on the tool engageable with means on the conduit means for forcing said conduit means between said first and second positions.

32. A switch for fluidly connecting a pipeline with a branch from the pipeline, comprising conduit means having one end adapted to be connected in alignment with one portion of the pipeline and its other end movable between positions for disposing it in alignment with either another portion of the pipeline or the branch, a tool adapted to pass through the conduit means, and means on the tool engageable with means on the conduit means for forcing said conduit means from one such position to another in response to passage of said tool through said conduit means, said forcing means being disposed entirely within said conduit means.

33. A switch of the character defined in claim 32, wherein said conduit means remains in the position to which it is forced until forced therefrom in response to passage of another tool therethrough.

34. Apparatus for use in fluidly connecting a pipeline with a branch from the pipeline, comprising a member adapted to be connected to the pipeline, a conduit shiftable with respect to said member between first and second positions for connecting one portion of the pipeline with either another portion of the pipeline or the branch, and means on the member and conduit cooperable with a tool adapted to pass through the conduit to force said conduit selectively from said first to said second position or from said second to said first position in response to such passage.

35. Apparatus for use in fluidly connecting a pipeline with a branch from the pipeline, comprising a member adapted to be fixed against rotation with respect to the pipeline, a conduit rotatable with respect to said member between first and second positions for connecting one portion of the pipeline with either another portion of the pipeline or the branch, and means on the member and conduit cooperable with a tool adapted to pass through the conduit to rotate said conduit selectively from said first to said second position or from said second to said first position in response to such passage.

36. Apparatus for use in fluidly connecting a pipeline with a branch from the pipeline, comprising conduit means having one end adapted to be connected in alignment with one portion of the pipeline and its other end movable between positions for disposing it in alignment with either another portion of the pipeline or the branch, and means for moving said conduit means selectively from either position to the other in response to passage of a tool through said conduit means from one pipeline portion to the other pipeline portion or to the branch, said conduit means remaining in the position to which it is moved until moved therefrom in response to passage of another tool therethrough.

37. Apparatus for use in fluidly connecting a pipeline with a branch from the pipeline, comprising conduit means having one end adapted to be connected in alignment with one portion of the pipeline and its other end movable between first and second positions disposing it in alignment with either another portion of the pipeline or the branch, and means to shift said conduit means from said first position to said second position, in response to passage of a tool in one direction through said conduit means, and from said second position to said first position, in response to passage of said tool in the opposite direction through said conduit means.

38. Apparatus for use in fluidly connecting a pipeline with a branch from the pipeline, comprising conduit means having one end adapted to be connected in alignment with one portion of the pipeline and its other end movable between first and second positions for disposing it in alignment with either another portion of the pipeline or the branch, and means on the tool cooperable with means on the conduit means for moving said conduit means selectively from said first position to said second position or from said second position to said first position in response to passage of a tool through said conduit means from one pipeline portion to the other pipeline portion or to the branch.

39. Apparatus for use in fluidly connecting a pipeline with a branch from the pipeline, comprising conduit means having one end adapted to be connected in alignment with one portion of the pipeline and its other end movable between positions for disposing it in alignment with either another portion of the pipeline or the branch, and means on the conduit means engageable by a tool adapted to pass through the conduit means for forcing said conduit means from one such position to another in response to passage of said tool through said conduit means, said forcing means being disposed entirely within said conduit means.

* * * * *